United States Patent
McMath

(10) Patent No.: US 11,946,737 B2
(45) Date of Patent: *Apr. 2, 2024

(54) SYSTEM AND METHOD FOR MEASURING THE INSIDE DIAMETER OF A PIPE

(71) Applicant: Mewbourne Oil Company, Hobbs, NM (US)

(72) Inventor: Erin McMath, Hobbs, NM (US)

(73) Assignee: Mewbourne Oil Company, Hobbs, NM (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/142,189

(22) Filed: May 2, 2023

(65) Prior Publication Data
US 2023/0266112 A1 Aug. 24, 2023

Related U.S. Application Data

(63) Continuation of application No. 17/035,139, filed on Sep. 28, 2020, now Pat. No. 11,692,804.

(51) Int. Cl.
| | |
|---|---|
| *G01B 5/12* | (2006.01) |
| *E21B 47/08* | (2012.01) |
| *F16L 55/44* | (2006.01) |
| *G01B 3/34* | (2006.01) |
| *G01B 3/46* | (2006.01) |
| *G01B 5/08* | (2006.01) |
| *G01B 7/13* | (2006.01) |
| *F16L 101/30* | (2006.01) |

(52) U.S. Cl.
CPC ............... *G01B 5/12* (2013.01); *E21B 47/08* (2013.01); *F16L 55/44* (2013.01); *G01B 3/34* (2013.01); *G01B 3/46* (2013.01); *G01B 5/08* (2013.01); *G01B 7/13* (2013.01); *F16L 2101/30* (2013.01)

(58) Field of Classification Search
CPC ... G01B 5/12; G01B 3/34; G01B 3/46; G01B 5/08; G01B 7/13; E21B 47/08; F16L 55/44; F16L 2101/30
See application file for complete search history.

(56) References Cited

U.S. PATENT DOCUMENTS

| | | |
|---|---|---|
| 5,600,069 A | 2/1997 | Girndt et al. |
| 5,867,275 A | 2/1999 | Curtis, Jr. et al. |
| 6,862,099 B2 | 3/2005 | Lam et al. |

FOREIGN PATENT DOCUMENTS

EP 3239585 11/2017

*Primary Examiner* — Herbert K Roberts
*Assistant Examiner* — Anthony W Megna Fuentes
(74) *Attorney, Agent, or Firm* — Scheef & Stone, LLP; Robin L. Barnes

(57) ABSTRACT

A system and method for measuring an inside diameter of a pipe to determine if it exceeds a predetermined value using a plurality of fingers operatively connected to a spring. When in a fully extended position, the distance between opposite fingers is the predetermined value. The fingers are pivotable between a starting position, through the fully extended position, and to a failing position. In the starting position, an outer end of each finger engages an inside surface of the pipe to compress the spring. If the diameter exceeds the predetermined value as the system moves through the pipe, the pipe inside surface will no longer engage the fingers, which releases the spring causing the fingers to pivot to the failing position, where they remain until the system is removed from the pipe and manually reset.

19 Claims, 10 Drawing Sheets

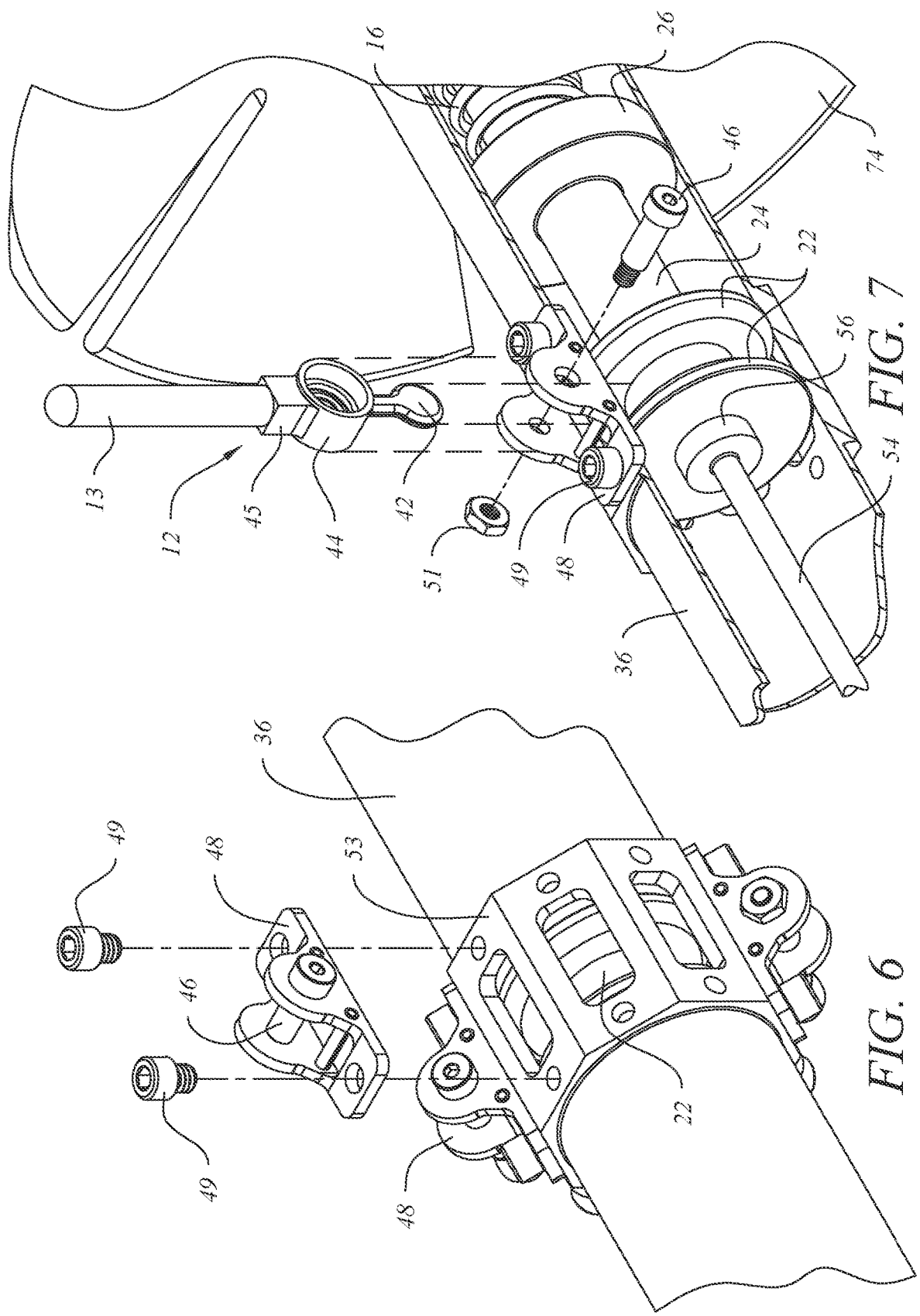

SYSTEM AND METHOD FOR MEASURING THE INSIDE DIAMETER OF A PIPE

CROSS REFERENCE TO RELATED APPLICATION

This application is a continuation of U.S. application Ser. No. 17/035,139, filed Sep. 28, 2020.

BACKGROUND OF THE INVENTION

1. Field of the Invention

This invention relates to a system and method for measuring the inside diameter of a pipe, tube, or other conduit, particularly those used in pressurized oilfield and industrial fluid operations, to make sure the diameter is within a predetermined tolerance of an acceptable diameter.

2. Description of Related Art

Oilfield and industrial applications frequently use pipes to transport fluids, such as gas or water, and particularly pressurized fluids, from one location to another. The pipes come in various nominal inside diameter (or ID) measurements, indicating that the pipe is intended to have a particular ID (+/−an acceptable tolerance) along the full length of the pipe. However, due to variations in manufacturing, the pipes may not have the proper ID along the full length of the pipe. For example, when extruding a plastic pipe there may be minor variations in the pipe wall thickness that result in differences in actual ID within the pipe along the length of the pipe. If the actual ID at any point in the pipe is too large (where the pipe wall material is thin), it may be susceptible to rupture when transporting pressurized fluids. Such a rupture can damage surrounding property, endanger workers near the pipe, create environmental hazards, and result in costly repairs. It is desirable to be able to measure the inside diameter along the length of a pipe so that only pipes having an ID within acceptable tolerance limits are used in such applications.

There are known systems and methods of measuring an inner dimeter along the length of a pipe to ensure it is within the tolerance range of the nominal ID for pipe. For example, U.S. Pat. No. 5,600,069 discloses ultrasonic testing using two linear arrays of ultrasonic transducers. The '069 patent requires a drive assembly to move the pipe being measured both axially and rotationally relative to the ultrasonic arrays to produce a three dimensional helical scan pattern of the pipe. Another example is U.S. Pat. No. 6,862,099, which discloses using lasers, sensors, and a processor to measure the diameter of the pipe. A wide light beam and light sensors are used to measure diameter in U.S. Pat. No. 5,867,275. The known systems require expensive or complicated electronic devices and data processing capabilities. There is a need in the art for a simple, manually operable device and method to measure the inner diameter of a length of pipe to ensure that the diameter is within acceptable tolerance limits, which does not require any electronic components or data processing capabilities.

SUMMARY OF THE INVENTION

Preferred embodiments of systems and methods according to the invention allow a length of pipe to be measured to determine if the inside diameter of the pipe at any point along its length exceeds a predetermined value using a simple, manually operable mechanical device. The preferred embodiments do not require any electronic components or data processing capabilities. Most preferably, the systems and methods also do not require any motorized components. According to one preferred embodiment, the predetermined value is preferably the maximum acceptable diameter value for the particular pipe being measured, which is typically the higher end of the tolerance threshold for the nominal ID of the pipe under any applicable industry standards. For example, using ASTM standards, a pipe with a nominal ID of 8.889" should have a diameter of 8.889"+/−0.219", or between 9.108" and 8.670", which would make the predetermined value 9.108" (the maximum acceptable diameter according to ASTM standards) in one preferred embodiment. In another preferred embodiment, the predetermined value may also be less than the maximum acceptable diameter under applicable industry standards. For example, the predetermined value may be (1) the nominal ID value (such as 8.889" in the above example); (2) the nominal ID value less a percentage of the range value (such as 0.219 in the above example) down to the minimum ID; or (3) the nominal ID value plus a percentage of the range value (such as 0.219 in the above example) up to the maximum. Most preferably, the percentage in options (2) and (3) are less than 100% and are preferably around 25-75%, more preferably around 50-75%. In another preferred embodiment, the predetermined value may be slightly larger than the maximum acceptable diameter according to applicable measurement standards (for example, 9.2" for the nominal ID of 8.889" example using ASTM standards). Although ASTM standards are frequently used, any other standards used in the industry may also be applied to set the predetermined value. According to another preferred embodiment, the predetermined value may be set according to the pipe user/purchaser's own specifications. A user/purchaser may have more stringent or less stringent requirements for how closely the actual pipe diameter matches its nominal diameter or falls within the acceptable range according to industry standards (for example, ASTM standards) and may set the predetermined value accordingly.

According to one preferred embodiment, a system of measuring an inside diameter of a pipe comprises an outer housing or central body, a plurality of pivotable fingers extending outwardly from the outer housing or central body, and a spring operatively connected to the fingers. The fingers are preferably pivotable from a starting position, through a fully extended position, to a failing position. The fingers are also preferably spaced apart around an exterior surface of the outer housing or central body. When in the fully extended position, the fingers are substantially perpendicular to the central body and a distance D1 between an outer end of a first finger and an outer end of a second finger disposed opposite of or 180° away from the first finger is equal to the predetermined value used against which the pipe inside diameter is measured. When in the starting position, outer ends of opposite fingers are at distance D2, which is shorter than the predetermined value, and the fingers are disposed at an angle and pointed in a rearward direction. The distance D2 allows an outer end of the fingers to engage with an inner surface of the pipe wall at a first end of the pipe where the system is inserted, to hold the fingers in the starting position, which compresses the spring. The system is then preferably pulled through the length of the pipe, but the system may also be pushed through the length of pipe. If the diameter at any point along the length of pipe exceeds D1 (which means the diameter exceeds the predetermined value), then the outer ends of the fingers will no longer be held in the starting position by the inner surface of the pipe, the spring will be released and the fingers will pivot to a failing position disposed at an angle pointed in a forward direction. When the measuring system reaches the second end of the pipe, a user may visually inspect the position of the fingers before pulling the system out of the pipe to determine if the fingers are still in the starting position or have been moved to the failing position.

According to another preferred embodiment, the system comprises a carrier disposed inside the outer housing or central body and configured to move longitudinally within the outer housing or central body. A carrier is also preferably configured to engage with a plurality of bearings, each bearing connected to one of the fingers, and to engage with the spring to actuate pivoting movement of the fingers substantially simultaneously. According to another preferred embodiment, the system comprises a compression rod with a forward end configured to engage with the carrier and a rearward end accessible by a user to allow a user to apply a forward pushing force on the compression rod, which applies a forward force on the carrier and compresses the spring. When a forward force is applied to the carrier and the spring is compressed, the fingers are pivoted to the starting position. When compression of the spring is released, the fingers are pivoted to the failing position.

According to another preferred embodiment, the system comprises an indicator rod that allows the position of the fingers to more easily viewed or determined before removing the system from the second end of the pipe being measured. Most preferably, the indicator rod is disposed at a forward end of the carrier, the compression rod, or both and is configured to move between a first position and a second position. In the first position, a forward end of the indicator rod is disposed more forwardly than when in the second position. The first position corresponds with the fingers being in the starting position and the second position corresponds with the fingers being in the failing position. In either position, the forward end of the indicator rod preferably extends more forwardly than the outer ends of the fingers. The visibility, or lack thereof, of a portion of the indicator rod when the system nears the second end of the pipe indicates whether the fingers are still in the starting position or have moved to the failing position.

According to yet another preferred embodiment, the system comprises one, or more preferably two, stabilizers or support bodies to aid in positioning the outer housing or central body in a substantially central location in the pipe to be measured. Most preferably each support body comprises a plurality of fins configured to engage with an inner surface of the pipe. According to another preferred embodiment, the system comprises a pull handle or bar at a forward end, allowing a semi-rigid strap or fish tape to be connected to the system to pull the system through the length of pipe.

According to another preferred embodiment, the system comprises a plurality of removable and interchangeable sets of fingers. Preferably, each set of fingers has a distance D1 that is different from other sets of fingers to allow the system to be used with pipes having different nominal ID measurements.

According to one preferred embodiment, a method of measuring an inner diameter of a pipe comprising: 1) providing a measuring device comprising a central body and plurality of fingers extending outwardly from an exterior surface of the central body, the fingers pivotable between a starting position and a failing position, and a spring connected to the fingers; (2) inserting the measuring device into a first end of the pipe to be measured so that the pivotable fingers are in the starting position and an outer end of each finger is engaged with an inside surface of the pipe; (3) moving the measuring device through the length of the pipe from the first end to a second end; and (4) viewing a position of the fingers at the second end of the pipe to determine if the fingers are in the starting position or the failing position.

According to another preferred embodiment, the viewing step comprises viewing a position of an indicator rod to determine a corresponding position of the fingers. According to yet another preferred embodiment, the method further comprises selecting a set of removable fingers having a D1 that corresponds to the nominal ID of the pipe being measured and attaching the fingers to the central body (or to bearings or a carrier) prior to inserting the device into the first end of the pipe.

The preferred embodiments of systems and methods according to the invention provide a reliable, easy, cost-effective, and simple mechanical way of measuring the inner diameter of a pipe to determine if the diameter is within allowable tolerances along its entire length.

BRIEF DESCRIPTION OF THE DRAWINGS

The system and method of the invention are further described and explained in relation to the following drawings

FIG. 6 is a partial perspective exploded view of the bearing mount and bearing bracket of FIG. 1;

FIG. 7 is a partial perspective exploded and cut-away view of a finger, bearing, and carrier of FIG. 1;

DESCRIPTION OF THE PREFERRED EMBODIMENTS

Figure 1:
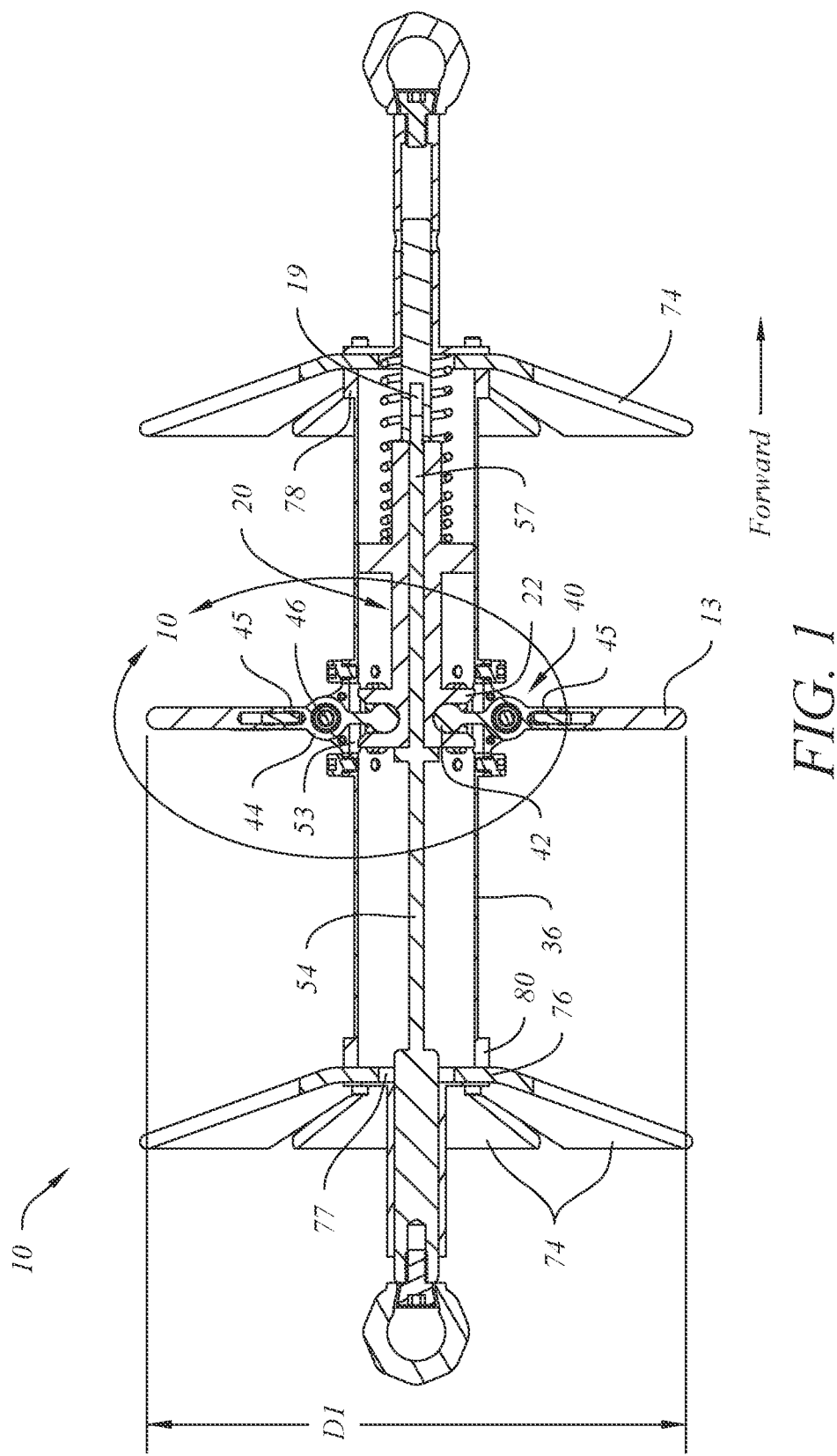
FIG. 1 is a cross-sectional side elevation view of a measuring system according to a preferred embodiment of the invention with the fingers in a fully extended position.

Referring to FIGS. 1-11, a system 10 for measuring an inside diameter of a pipe, tube, or other conduit according to one preferred embodiment comprises a plurality of fingers 12, a spring 16, an optional indicator rod 18, a carrier 20, an outer housing 30, a plurality of bearings 40, and a compression rod 50. Outer housing 30 preferably comprises a rear shoulder 34, an annular or cylindrical neck 32 extending rearwardly from shoulder 34, a forward shoulder 37, an annular or cylindrical neck 38 extending forwardly of shoulder 37, and a central cylindrical body 36 disposed between shoulders 34, 37. A carrier 20 is preferably disposed inside outer housing 30 and comprises a socket body 22, a central carrier body 24, an annular lip 26, and a forward carrier body 28. Carrier 20 is preferably configured to longitudinally move within outer housing 30 between a first position and a second position, the first position being more forward relative to rear shoulder 34 than the second position. Socket body 22 is preferably a cylindrical body with a plurality of recesses, each configured to receive and secure an inner bearing body 42 of a bearing 40. Socket body 22 is preferably connected to or integrally formed with central carrier body 24 and disposed at a rearward end of central carrier body 24. An annular or cylindrical lip 26 is preferably disposed around central carrier body 24, forwardly of socket body 22. Annular lip 26 is configured to provide a rearward stop for spring 16. An outer surface of socket body 22 and annular lip 26 preferably contact an inner surface of central cylindrical body in slidable engagement, allowing carrier 20 to move within outer housing 30.

Spring 16 is preferably operatively connected to the plurality of fingers 12, to aid in actuating movement of the fingers from a starting position to a failing position as further described below. Spring 16 is most preferably disposed inside outer housing 30, between annular lip 26 and a forward shoulder 37 of outer housing 30 and around an outer surface of carrier forward body 28. When carrier 20 is pushed forward by a user prior to using system 10, spring 16 is compressed by annular lip 26 against forward shoulder 37 and the fingers are in the starting position. When compression on the spring is released, the fingers pivot to the failing position.

Each bearing 40 preferably comprises an inner body 42 connected to, or more preferably integrally formed with, a bearing body 44 and a neck 45 extending outwardly from the bearing body 44. Inner bearing body 42 is preferably rounded to allow rotational movement in a forward and rearward direction within socket body 22. Each bearing body 44 is preferably connected or attached to a bearing mount 48, such as by a screw or bolt 46 and nut 51. An o-ring 84 and washer 86 are preferably disposed on either side of bearing body 44, with bolt 46 and nut 51 disposed outwardly from the washer 86. A pair of rods 55 are preferably disposed through each bearing mount 48 to provide stability for bearing body 44 as it rotates when the fingers 12 are moved from a starting to a failing position. Each bearing mount 48 is preferably connected or attached to a bracket 53 that is attached to outer housing 30, most preferably to an exterior surface of central cylindrical body 36, such as by a screw 49 inserted to aligned apertures in bearing mount 48, bracket 53, and cylindrical body 36. Alternatively, bracket 53 may be permanently affixed to or integrally formed with cylindrical body 36 and an attachment mechanism, such as screw 49 may attach bearing mount 48 to bracket 53 through an aligned aperture and recess in these parts. Each bearing body 44 preferably comprises an outwardly extending neck 45 into which a recess 47 is preferably disposed. Each recess 47 is preferably configured to receive a finger attachment body 14. Most preferably, each recess 47 comprises threads to mate with corresponding threads on a finger attachment body 14.

Fingers 12 are preferably spaced apart around an outer circumference of central cylindrical body 36 (or outer housing 30), as are bearing mounts 48. Fingers 12 are spaced apart so that each finger 12 is located opposite another finger 12 across the central cylindrical body, forming multiple pairs of fingers with a 180° separation from the outer ends of each finger 12 in a pair of opposite fingers 12 (as shown in FIG. 1). This spacing and orientation of fingers 12 allows for accurate measurement of the diameter of the pipe being measured. Fingers 12 may also abut each other or may have sides that overlap. Each finger 12 preferably comprises a finger outer body 13 and a finger attachment body 14. A radially outward end of each finger body 13 is preferably rounded to prevent damaging the interior of the pipe, while also allowing the fingers 12 to slide smoothly against the interior of the pipe at any given angle α. When fingers 12 are disposed in a fully extended position substantially perpendicular to central cylindrical body 36, as shown in FIG. 1, the distance D1 between an outer end of a first finger 12 and an outer end of a second finger 12 disposed opposite of or 180° away from the first finger 12 is equal to a predetermined value against which a pipe is to be measured. In one preferred embodiment, D1 is equal to the maximum allowable inside diameter within acceptable tolerances for a particular nominal ID. In another preferred embodiment, D1 is between 0% to 0.2% longer or between 0.000" to 0.020" longer, than the maximum allowable inside diameter within acceptable tolerances for a particular nominal ID of the pipe being measured. D1 may be set according to user requirements, which may be more or less stringent than the acceptable ID range for a particular nominal ID according to ASTM or other industry standards. Most preferably, outer finger body 13 is made from steel, tungsten, stainless steel, or a composite material, but other rigid and hard materials may also be used so the finger body does not flex or bend against the inside of the pipe. This also allows the outer finger body 13 to be hard enough that it is less likely to be worn down (which would shorten the distance D1) by sand and other abrasive materials that may be inside the pipe being measured.

Figure 2:
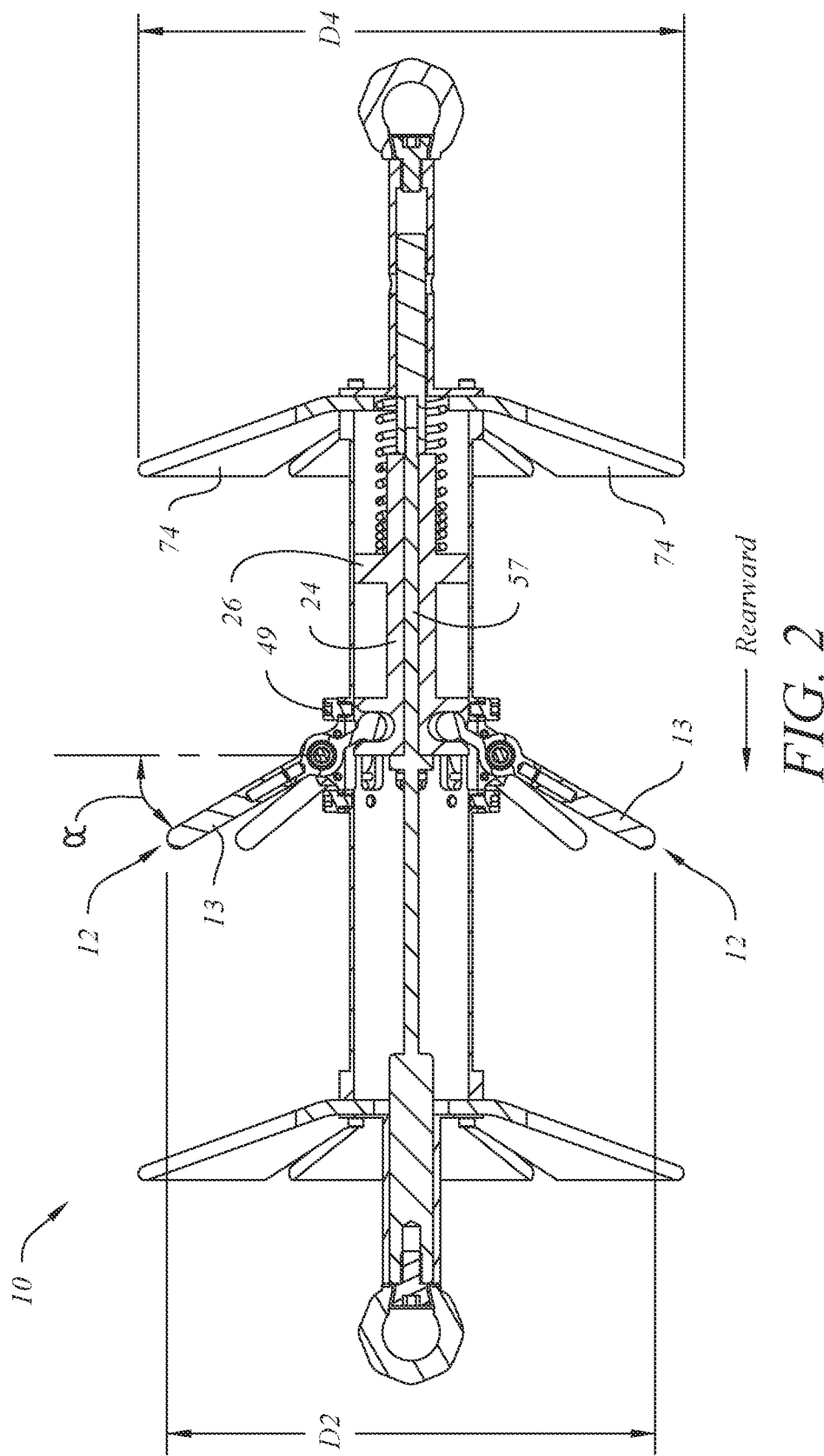
FIG. 2 is a cross-sectional side elevation view of the measuring system of FIG. 1 with the fingers in a starting or running position.

When in a running or start position, as shown in FIG. 2, fingers 12 are preferably disposed at an angle α in a rearward direction (from a vertical axis perpendicular to a longitudinal axis through outer housing 30 or central body 36), such that an outer end of each finger body 13 is pointed in a rearward direction. When in this position, the distance D2 between an outer end of a first finger 12 and an outer end of a second finger 12 disposed opposite of or 180° away from the first finger 12 is shorter than the predetermined value D1 against which the inside diameter for a pipe being tested is measured. Most preferably D2 is equal to or slightly shorter than (preferably around 0%-0.2% shorter, but other percentages may also be used) the minimum allowable ID according to ASTM or other applicable industry standards or user specifications for the pipe to be measured. For example, a pipe with a nominal ID of 4.62" can have an actual inside diameter of 4.505" to 4.733" and still be considered within an acceptable tolerance to be useable with pressurized applications. D1 for such a pipe would preferably be 4.735" (or around 4.733" to 4.740") and D2 for such a pipe would preferably be around 4.505 to 4.500. The measured angle α is not critical, but it must provide a D2 that allows system 10 to be inserted into the pipe. Typically angle α will be around 31° to 35°, more preferably 31.6° to 32.0°, in a rearward direction. Because D2 is preferably equal to or slightly shorter than the minimum allowable ID for a pipe being measured, if system 10 cannot be inserted into a pipe then the pipe would fail the test as having an actual ID that is below the acceptable range.

Figure 3:
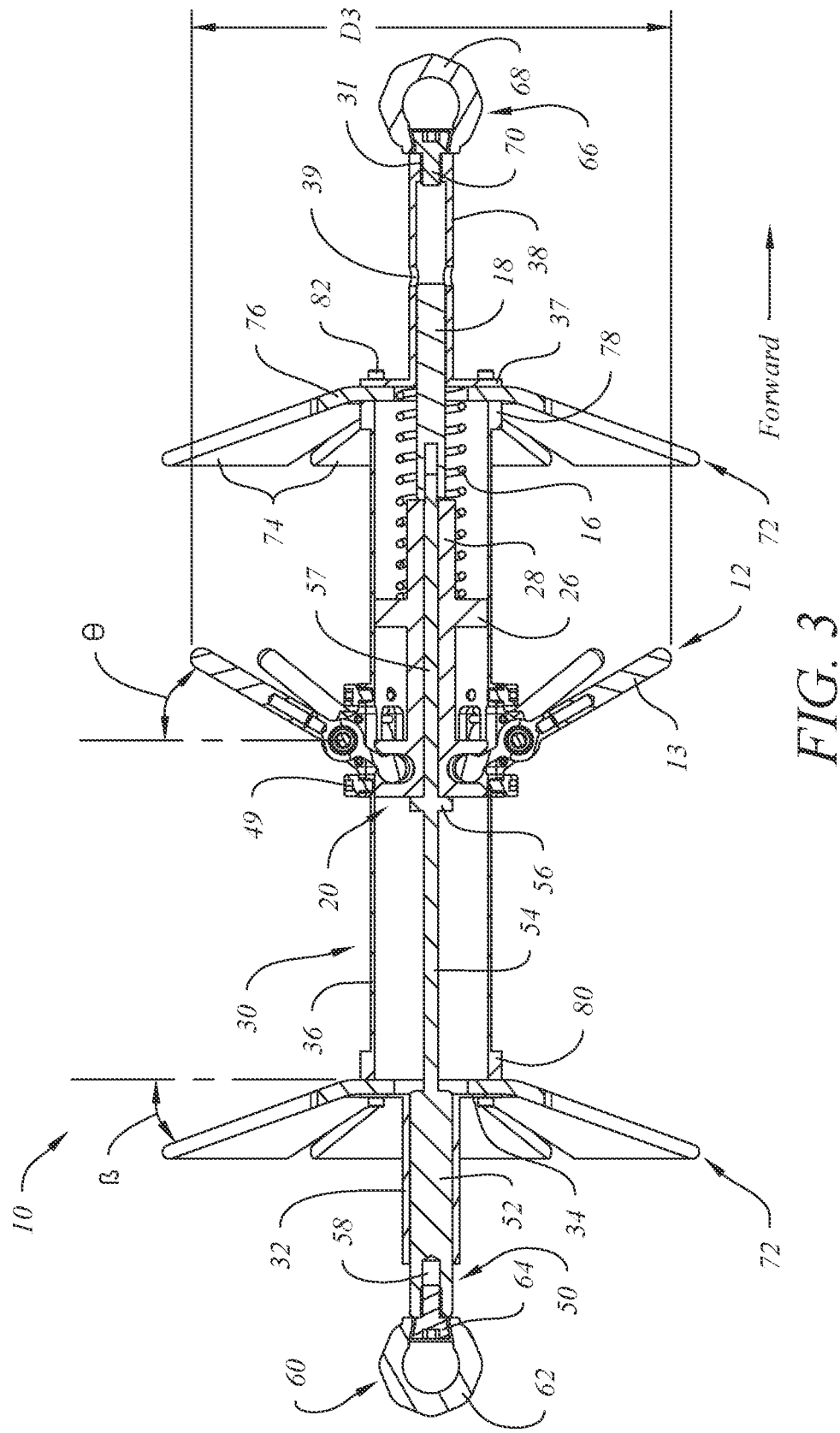
FIG. 3 is a cross-sectional side elevation view of the measuring system of FIG. 1 with the fingers in a failing position.
Figure 4:
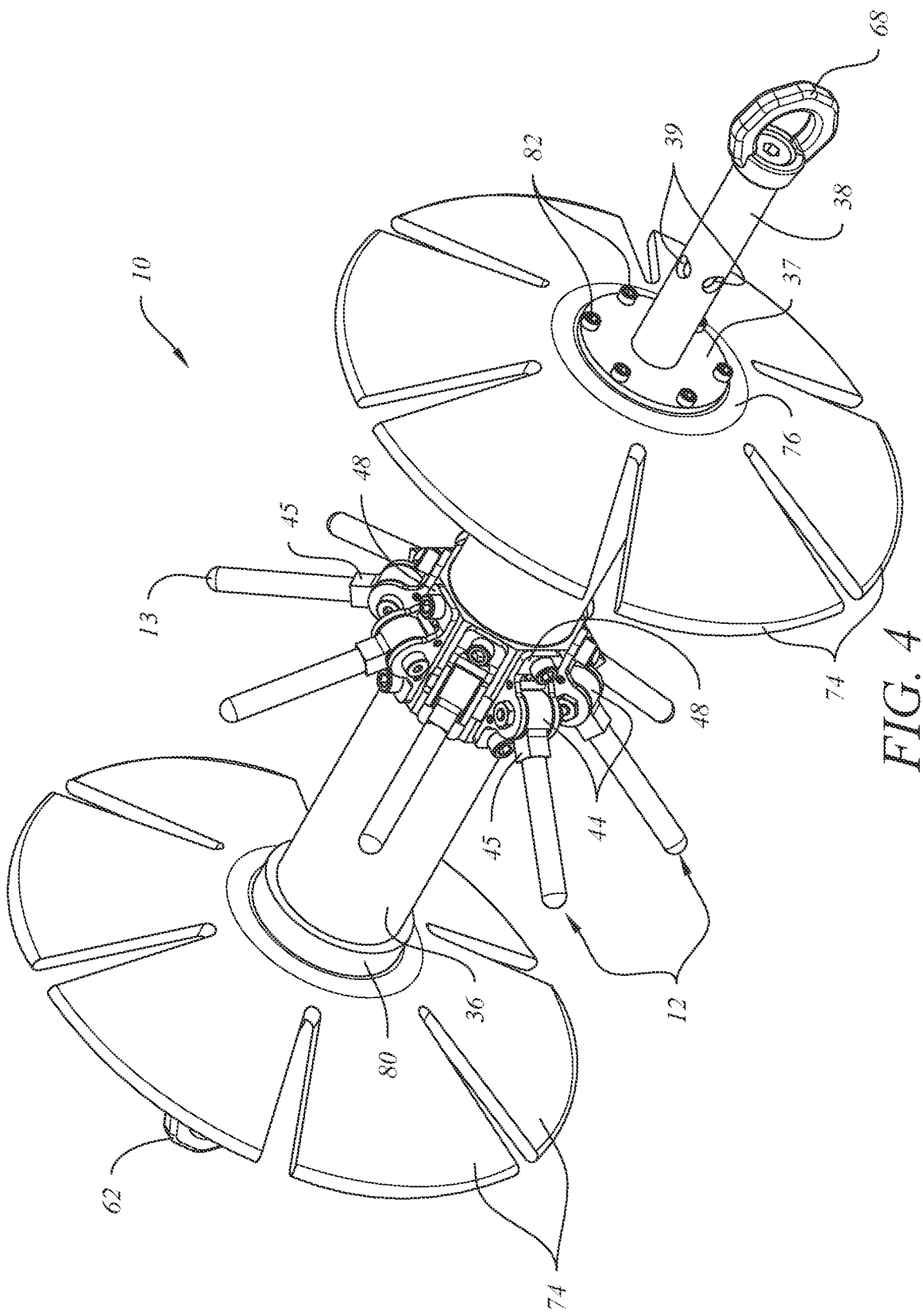
FIG. 4 is a front perspective view of the measuring system of FIG. 1 with the fingers in a starting or running position.
Figure 5:
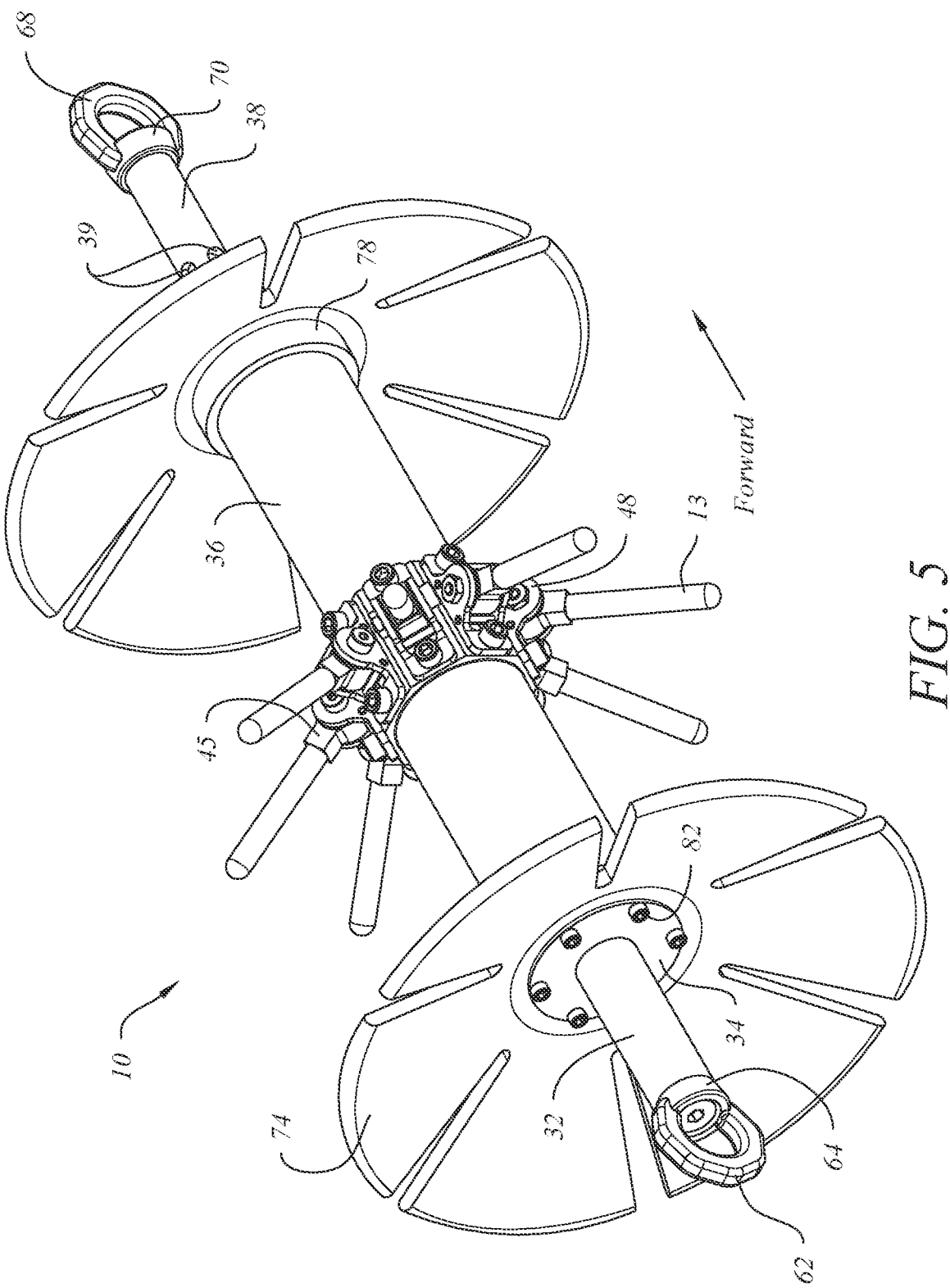
FIG. 5 is a rear perspective view of the measuring system of FIG. 1 with the fingers in a starting or running position.

When in a failing position, as shown in FIG. 3, fingers 12 are preferably disposed at an angle θ of 31° to 35°, more preferably 31.6° to 32.0°, in a forward direction from a vertical axis perpendicular to a longitudinal axis through outer housing 30 or central body 36, such that an outer end of each finger body 13 is pointed in a forward direction. When in this position, the distance D3 between an outer end of a first finger 12 and an outer end of a second finger 12 disposed opposite of or 180° away from the first finger 12 is preferably the same as D2, but D3 may also be shorter than D2.

Figure 8:
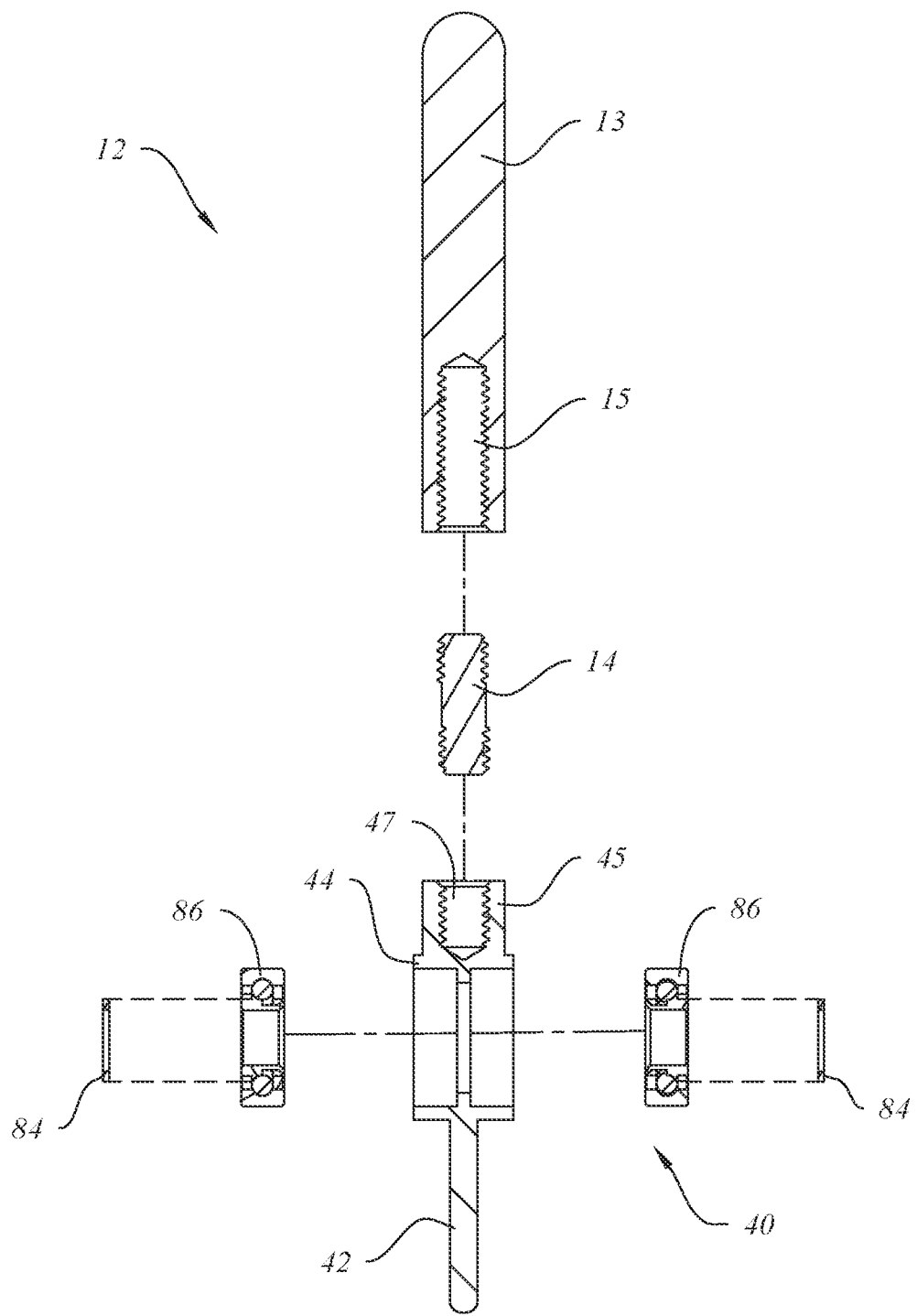
FIG. 8 is an exploded cross-sectional rear elevation view of a finger and bearing according to one preferred embodiment.
Figure 9:
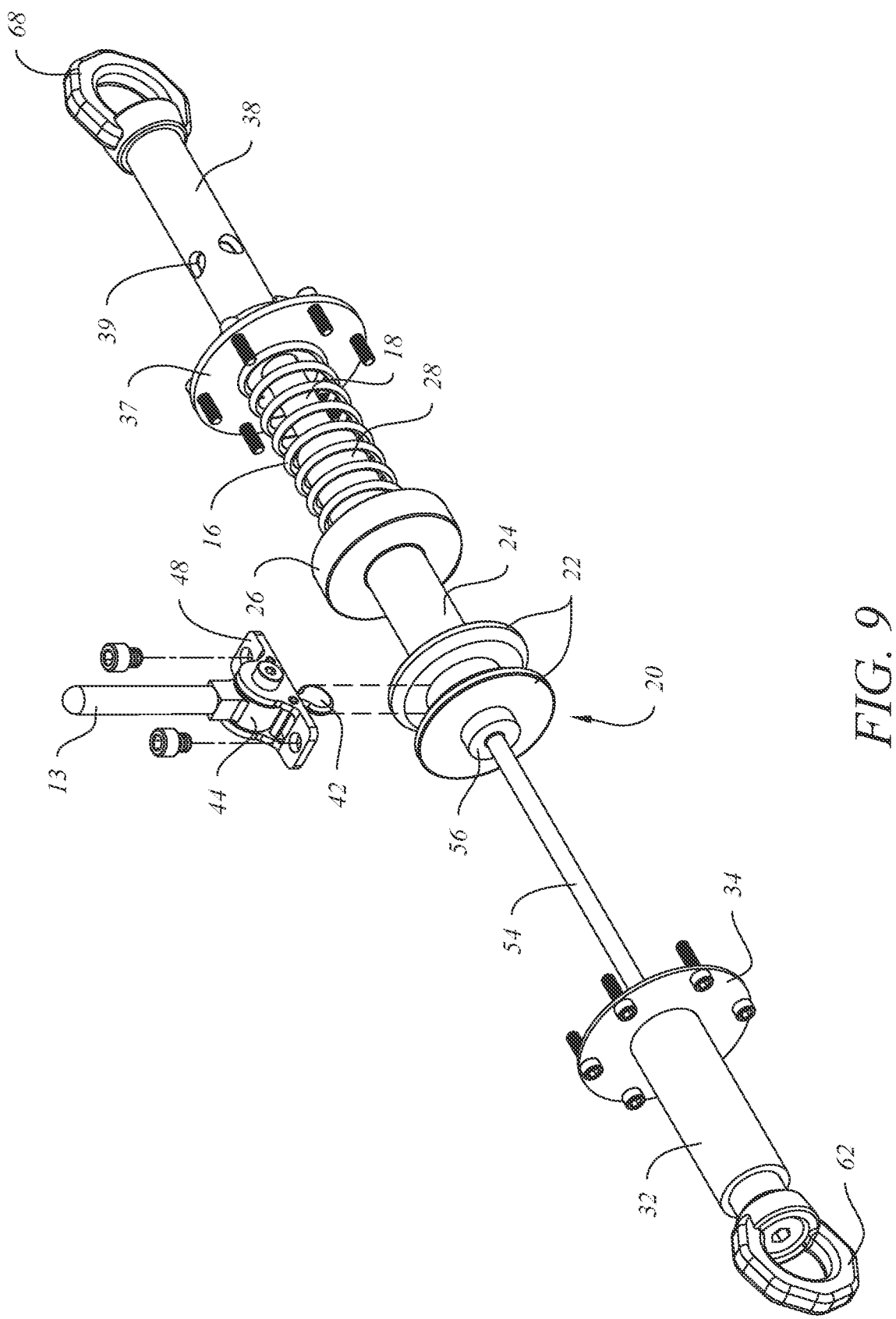
FIG. 9 is a rear perspective view of the measuring system of FIG. 1 without the central cylindrical body or bearing bracket.
Figure 10:
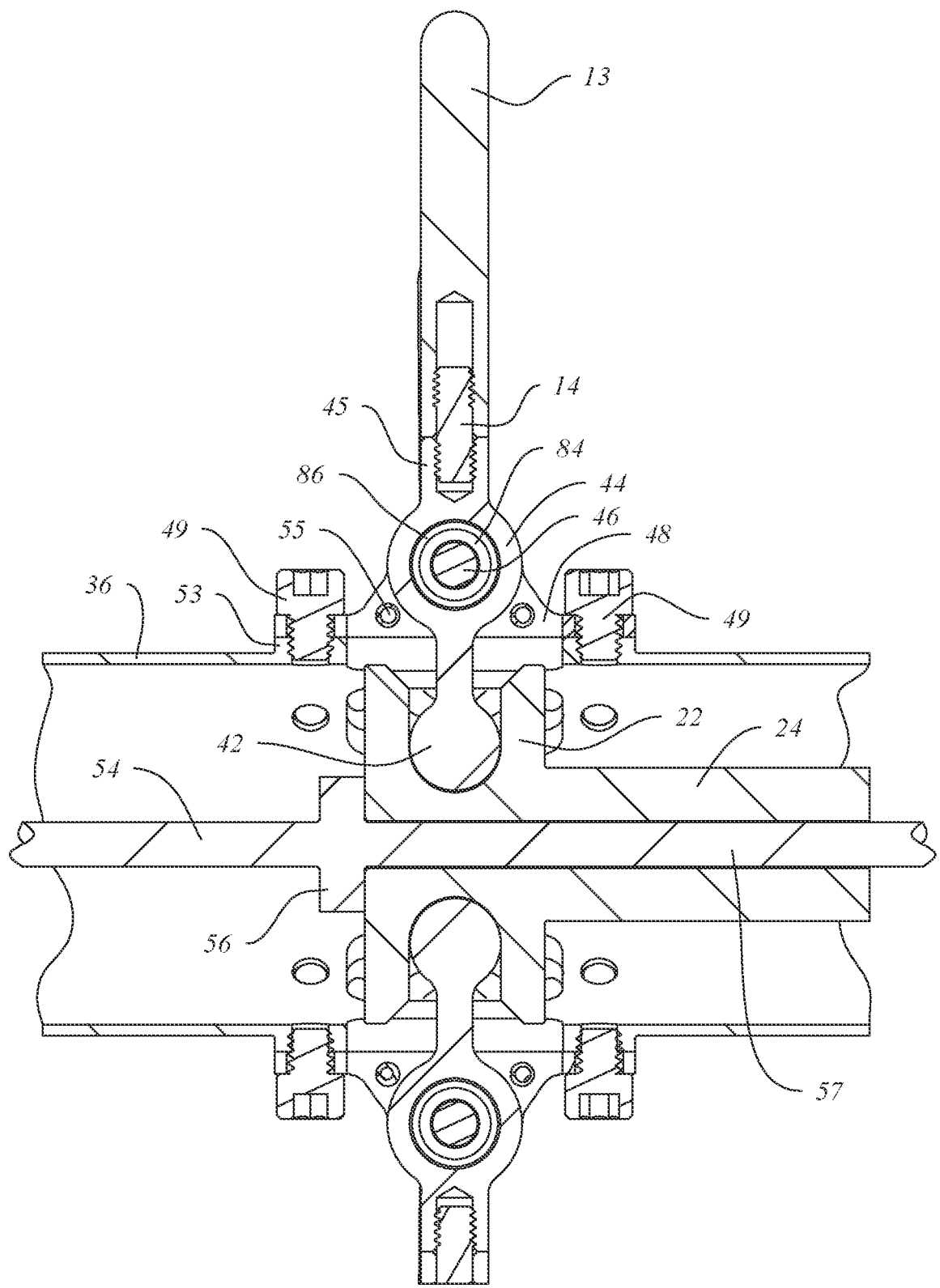
FIG. 10 is a close-up view of a portion of FIG. 1.
Figure 11:
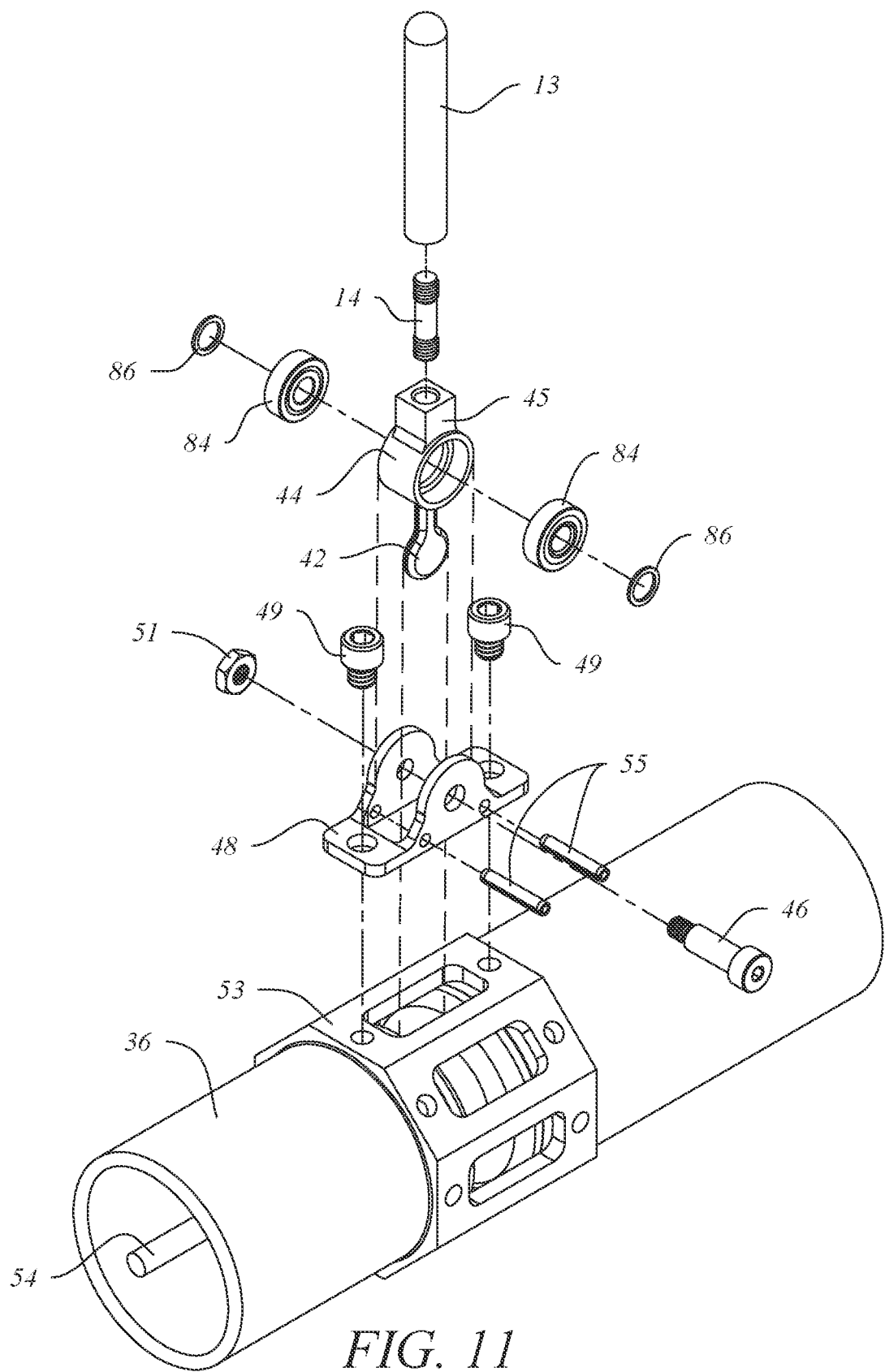
FIG. 11 is a partial exploded perspective view of a finger, bearing, bearing mount, bracket, and central cylindrical body of FIG. 1.

Most preferably, an inner end of each finger outer body 13 comprises a recess 15 configured to receive a first end of a finger attachment body 14 and each neck 45 of bearing 40 comprises a recess 47 configured to send end of a finger attachment body 14. Most preferably each recess 15, 47 comprises threads to mate with corresponding threads on a finger attachment body 14, as shown in FIG. 8. Alternatively, finger attachment body 14 may be integrally formed with or an outer end of finger attachment body 14 may be permanently affixed to (such as by adhesive) to recess 15, with a portion of finger attachment body 14 extending outwardly from (toward central cylindrical body 36) an inner end of finger outer body 13 to allow the portion of finger attachment body 14 to engage with recess 47 on bearing neck 45. This allows each finger 12 to be removed from bearing 40 so that fingers 12 of different lengths may be attached to bearing 40 to test different diameters. As another alternative, finger attachment body 14 may be integrally formed with or an inner end of finger attachment body 14 may be permanently affixed to (such as by adhesive) to recess 47, with a portion of finger attachment body 14 extending outwardly from an outer end of bearing neck 45 to allow the portion of finger attachment body 14 to engage with recess 15 on finger outer body 13. As an alternative to threaded engagement between finger attachment body 14 and either or both recesses 15, 47, other types of engagement, such as pressure or friction fitting or a combination of pressure fitting and threaded engagement, may also be used to allow fingers 12 of one length to be removed and replaced with fingers 12 of a different length. Most preferably, two or more sets of fingers 12, each set providing a different D1 length may be included in measuring system 10, to allow fingers 12 to be changed to allow for measuring or testing pipes of different diameters. Most preferably, each finger 12 in a set comprises finger outer bodies 13 having the same length, but different from the lengths of finger outer bodies 13 in another set. Preferably there are 4-10 fingers 12, more preferably 6-8 fingers 12, in system 10 or in each set of fingers used with system 10.

Compression rod 50 preferably comprises a rearwardly extending body 52, a central body 54, an annular lip 56, and a forward body 57. Rearwardly extending body 52 is preferably at least partially disposed inside rearwardly extending neck 32 of outer housing 30 and is configured to move longitudinally relative to outer housing 30 between a compressed position (as shown in FIG. 2) and an extended position (as shown in FIG. 3. When in the compressed position, preferably all of compression rod 50 is disposed inside rearward neck 32 and central cylindrical body 36. When in the extended position, preferably a portion of compression rod 50 extends rearward from neck 32 and another portion is disposed inside neck 32. Central compression body 54 preferably extends forwardly from rear compression body 52. An annular lip 56 is preferably disposed around a forward end of central compression body 54 and configured to abut a rear facing end of socket body 22. Forward compression body 57 preferably extends forwardly of annular lip 56 through socket body 22, carrier central body 24, annular lip 26, and carrier forward body 28.

Most preferably, a forward most end of forward compression body 57 extends beyond a forward most end of carrier forward body 28.

A push handle 60 is preferably disposed at a rearward end of compression rod 50. Push handle 60 preferably comprises a push handle body 62 connected to a push handle attachment body 64. Push handle body 62 preferably comprises a ring or a bar that may be gripped by a user to apply a pushing force on handle 60 just prior to using measurement system 10. Body 62 may be integrally formed with or attached by a hinge, threads, screws, adhesive, or pressure or friction fitting to push handle attachment body 64. Most preferably push handle attachment body 64 comprises exterior threads that are configured to mate with corresponding threads on an interior of a recess 58 disposed in a rearward end of compression rod rearward body 52. When a user applies a pushing force to push handle 60, compression rod 50 is pushed forward with annular lip 56 configured to provide a forward force on socket body 22 to move socket body 22 to a forward position to force fingers 12 into a rearwardly pointing running or start position, as shown in FIG. 2, and allows annular lip 26 to provide a forward force on spring 16 to compress spring 16.

An optional indicator rod 18 may also be used with system 10. When used, indicator rod 18 is preferably disposed inside outer housing 30, forwardly of carrier 20. An inner end of an indicator rod 18 preferably abuts a forward facing end of forward carrier body 28 and an outer end of indicator rods preferably extends through an aperture in forward shoulder 37 and into forwardly extending neck 38. Forwardly extending neck 38 preferably comprises a viewing aperture 39, more preferably a plurality of viewing apertures 39 spaced around the circumference of neck 38. Aperture 39 allows a user to view the position of indicator rod 18 at a second end (or forward end) of the pipe being measured before system 10 is fully pulled out of the pipe, as more fully explained below.

Most preferably, indicator rod 18 is attached to forward body 57 of compression rod 50. An inward end of indicator rod 18 preferably comprises a recess 19 configured to receive a forward end of forward compression body 57. Most preferably recess 19 comprises threads to mate with corresponding threads on a forward end of forward compression body 57. Indicator rod 18 may also be attached to a forward end of carrier forward body 28, by threaded engagement, adhesive, pressure or friction fitting. Alternatively, indicator rod 18 may be integrally formed with part of carrier 20 (such as carrier forward body 28) or part of compression rod 50 (such as compression forward body 57). Most preferably, compression rod 50, carrier 20, and indicator rod 18 are configured in engagement such that longitudinal movement through outer housing 30 is simultaneous and in unison.

A pull handle 66 is preferably disposed at a forward end of forward neck 38. Pull handle 66 preferably comprises a pull handle body 68 connected to a pull handle attachment body 70. Pull handle body 68 preferably comprises a ring or a bar that may be attached or connected to a length of semi rigid strap, sometimes referred to as "fish tape," to allow system 10 to be pulled through a length of pipe to measure the inside diameter of the pipe. System 10 may also be pushed through the length of pipe. System 10 is preferably pulled or pushed through the length of pipe by manpower without needing any motorized assistance or power requirements; however, a winch or other powered device may be used to assist in pulling or pushing system 10 through the length of pipe. Body 68 may be integrally formed with or attached by a hinge, threads, screws, adhesive, or pressure or friction fitting to pull handle attachment body 70. Most preferably pull handle attachment body 70 comprises exterior threads that are configured to mate with corresponding threads on an interior of an annular recess 31 disposed in a forward end of forwardly extending neck 38. When a user applies a pulling force to pull handle 66 by pulling on the connected strap, system 10 is pulled from a first end of the pipe being measured through to the opposite end of the pipe being measured.

Most preferably, compression rod 50, carrier 20, and indicator rod 18 are configured in engagement such that longitudinal movement through outer housing 30 is simultaneous and in unison. Additionally, socket body 22 of carrier 20 is configured with respect to bearings 40 that movement of carrier 20 results in movement of each finger in a direction substantially opposite the direction of movement of carrier 20, with the fingers all moving simultaneously. This allows all fingers to be moved from a starting position to a failing position (if the inside diameter of the pipe exceeds the predetermined threshold) in unison. Thus when a pushing or compression force is applied by a user to compression rod 50 then compression rod 50, carrier 20, and indicator rod 18 are all moved forwardly and spring 16 is compressed, such that the outer end of each finger 12 is moved rearwardly to the starting position. When the pushing or compression force is released (when system 10 is not in a pipe), the spring 16 will no longer be compressed, which will force the carrier 20 (and the connected compression rod 50 and indicator rod 18) rearwardly, such that the outer end of each finger 12 is moved forwardly to the failing position. When in use inside a pipe, the compression force on the spring 16 initially applied by a user through the compression rod 50 prior to inserting system 10 into the pipe is maintained by engagement between an inner surface of the pipe and an outer end of each finger 12 until the fingers reach a point in the pipe where the inside diameter exceeds the predetermined value D1, at which point the compression on the spring 16 is released, causing the carrier 20 to move rearwardly and the outer end of each finger to move forwardly to the failing position.

According to another preferred embodiment, system 10 further comprises a stabilizer or support body 72, most preferably two stabilizers or support bodies 72, one disposed near forward shoulder 37 and a second disposed near rear should 34. Support bodies 72 are designed to aid in stabilizing system 10 so that outer housing 30 or central cylindrical body 36 is maintained in a substantially central location within the pipe being measured. Each support body 72 preferably comprises a central annular hub 76 having a central aperture 77 and a disc that extends outwardly from the central hub 76. Most preferably, the disc comprises a plurality of fins 74 extending radially outwardly from central hub 76. Central aperture 77 on a rearward support body allows rearwardly extending compression body 52 to move through hub 76. Central aperture 77 on a forward support body allows indicator rod 18 to move through hub 76. Fins 74 are preferably spaced apart around the circumference of hub 76, but may also abut each other or have overlapping sides or a solid disc may be used. Most preferably, the fins 74 are sufficiently spaced apart and the spaces between fins 74 positioned relative to the fingers 12 that the position of the fingers in the starting or failed position may be viewed from a forward end of system 10 by looking through the spaces in the fins 74 prior to removing system 10 from the second end of the pipe. This is particularly helpful if an indicator rod 18 is not used. Alternatively, the stabilizing disc or fins 74 may be directly connected to central cylindrical body 36. A distance D4 between an outer end of a first fin 74 and an outer end of a second fin 74 disposed opposite of or 180° away from the first fin 74 (or opposite outer edges of a stabilizing disc) is preferably the same as D1 or slightly larger than D1. Preferably D4 (when not compressed by an inner surface of a pipe) is between 0″ to 0.25″ longer, more preferably between 0.010″ to 0.100″ longer, than the predetermined value D1. Preferably, stabilizing disc or fins 74 are substantially perpendicular to central cylindrical body 36 when system 10 is not inside a pipe. Alternatively, stabilizing disc or fins 74 are disposed an angle β around 25° to 35°, more preferably around 29° to 31°, or if initially substantially perpendicular are flexible enough to bend to an angle β once system 10 is inserted into a pipe. Angle β is measured in a rearward direction from a vertical axis substantially perpendicular to a longitudinal axis through outer housing 30 or central cylindrical body 36, such that stabilizing disc or fins 74 form a frustoconical shape with their outer ends pointed in a rearward direction. Other angles for β may also be used. Most preferably, a stabilizing disc or fins 74 are made of rubber or plastic and are rigid enough to substantially support the weight of system 10, but also flexible enough to allow system 10 to be moved through a pipe having variations in the inside diameter along the length of the pipe without becoming stuck inside the pipe. Additionally, the flexibility of stabilizing disc or fins 74 allows the distance D4 to be compressed to around 80% to 85% of the non-compressed D4 values indicated above. This allows system 10 to be used with pipes of different, but close nominal ID values using the same stabilizer or support body 72.

According to another preferred embodiment, system 10 comprises a plurality of sets of discs or fins 74, each set comprising a disc or set of fins that provide a D4 length different from the D4 length of another disc or another set of fins. Most preferably, each fin 74 in a set has the same length, but different from the lengths of fins 74 in another set. This allows disc or fins 74 to be interchangeable with different D4 lengths depending on the size pipe being measured. Such interchangeable fins 74 may be releasably connected to hub 76, preferably by pressure or friction fitting. As an additional alternative, interchangeable support bodies 72 may be used, each having integrally formed or affixed discs or fins 74 with each support body having a disc or fins 74 to provide a D4 length that is different from the D4 length of another support body 72.

When support body 72 is used, outer housing 30 preferably comprises a forward inner shoulder 78 disposed at a forward end of central cylindrical body 36 and a rearward inner shoulder 80 disposed at a rearward end of central cylindrical body 36. In this embodiment, forward shoulder 37 and rearward shoulder 34 are preferably separate from central cylindrical body 36 to allow insertion of a support body 72. Central hub 76 of a first, forward support body 72 is disposed between forward inner shoulder 78 and forward outer shoulder 37. Central hub 76 of a second, rearward support body is disposed between rearward inner shoulder 80 and rearward outer shoulder 34. Outer shoulders 34, 37 and each central hub 76 preferably have a plurality of spaced apart apertures that align with each other and corresponding recesses in inner shoulders 78, 80 to allow the respective shoulders to be connected together, with a hub 76 disposed between each shoulder pair 34, 80 or 78, 37, by an attachment mechanism 82, such as a screw.

According to another preferred embodiment, a measuring system comprises an outer housing 30, a plurality of pivotable fingers 12 extending outwardly from the outer housing and connected together to move in unison, and a spring operatively connected to at least one of the fingers and disposed on an exterior of housing. Most preferably, the fingers are pivotable from a starting position through a fully extended position to a failing position, just like in system 10. Unlike system 10, a spring in this embodiment is preferably disposed on exterior of outer housing 30 (or central cylindrical body 36) on a rearward side of the fingers 12. When the fingers are in the starting position, the spring is compressed. The fingers may be pulled down to the starting position by manually maneuvering one of the fingers in a rearward and downward direction, which will move all of the fingers since they are connected together. Alternatively, a connector between the fingers, such as a cord or webbing, may be pulled to move the fingers to the starting position and compress the spring. The fingers 12 may be pivotable on a bearing 40 (like in system 10) or may be simply hinged to an exterior surface of outer housing 30 or central cylindrical body 36. A user would manually hold the fingers or connector to maintain the fingers in the starting position while inserting the system into a pipe until an inside surface of the pipe engages a portion of the finger outer body 13 (or the outer ends of the fingers) sufficiently to hold the spring in a compressed position. As the system moves through the pipe, if the inside diameter exceeds predetermined value D1 at any point, the fingers will no longer be engaged with the inner surface of the pipe, which will release compression of the spring forcing the fingers to flip into the failing position.

According to one preferred embodiment, a method of measuring an inside diameter of a length of pipe comprising a first end and a second end comprises (1) providing a measuring device comprising a central body (or outer housing), a plurality of fingers extending outwardly from the central body (or outer housing), the fingers pivotable between a starting position, through a fully extended position, and to a failing position, and a spring operatively connected to the fingers; (2) inserting the measuring device into the first end of the pipe to be measured so that the pivotable fingers are in the starting position, with at least a portion of the fingers (preferably an outer end of each finger) being engaged with an inside surface of the pipe at the first end; (3) moving the measuring device through the length of the pipe from the first end to the second end; and (4) viewing a position of the fingers at the second end of the pipe to determine if the fingers are in the starting position or the failing position. Step (4) is carried out prior to removing the measuring device from the second end of the pipe. Most preferably, the measuring device comprises a marking (such as apertures 39, but other types of markings may be used) to indicate that the viewing step should be carried out once the marking is visible from outside the second end before proceeding to move the measuring device all the way out of the pipe.

Although system 10 may be used with this preferred method, other measuring devices may also be used. Most preferably (and as previously described with system 10), measuring device has a distance D1 between an outer end of one finger and an outer end of a second finger disposed opposite of or 180° away from the first finger when in the fully extended position is the predetermined value, which may be the maximum acceptable diameter within tolerances for the particular nominal ID being measured or slightly longer than the maximum acceptable diameter. The fingers are preferably substantially perpendicular to the outer housing or central body when in the fully extended position. Preferably, a measuring device also has a distance D2 between opposite fingers in the starting position that is shorter than D1. For example, D2 may be between 1.300" to 1.400" shorter than D1 according to one preferred embodiment. Most preferably, according to another preferred embodiment, D2 is equal to or slightly shorter than (preferably around 0%-0.2% shorter) the minimum allowable ID (according to industry standards or user specifications) for the pipe to be measured. Other dimensions may also be used for D2, depending on the value in D1, provide D2 is shorter than D1. When the fingers are in the starting position, the spring is compressed. When initially inserted into the first end of the pipe, the engagement between a portion of the fingers (such as the outer ends of the fingers) and the inside surface of the pipe applies sufficient pressure to maintain the spring in a compressed position. As the measuring device is moved through the length of pipe, if the diameter of the pipe exceeds the distance D1, the inside surface of the pipe will no longer apply pressure on the fingers, which releases the spring and forces the fingers into the failing position. Preferably, when in the starting position, the fingers are disposed at an angle α of 31° to 35°, more preferably 31.6° to 32.0°, from a vertical axis substantially perpendicular to a central longitudinal axis through the pipe (or through the central body or outer housing), with the ends of the fingers pointed in a rearward direction (toward the first end of the pipe). Preferably, when in the failing position, the fingers are disposed at an angle θ of 31° to 35°, more preferably 31.6° to 32.0°, from the vertical axis substantially perpendicular to a central longitudinal axis through the pipe (or through the central body or outer housing), with the ends of the fingers pointed in a forward direction (toward the second end of the pipe).

Most preferably angle θ is equal to α, such that distance D2 is equal to the distance D3 between an outer end of a first finger in the failing position and an outer end of a second finger opposite the first finger in the failing position), but angle θ may also be larger than angle α so that D3 is shorter than D2 to ensure the outer ends of the fingers in the failing position do not get caught on an inside surface of the pipe at any point in the pipe where the diameter returns to a smaller diameter, which could force the fingers back to the starting position, making it difficult to determine if the pipe actually failed or passed the measurement test. Once in the failing position, the fingers are preferably configured so they do not pivot back to the starting position until the measuring device is removed from the pipe and reset to measure a different pipe. Most preferably, the viewing step is carried out before the measuring device is removed from the second end of the pipe. If the fingers remain in the starting position when the measuring device reaches the second end of the pipe, the user knows the diameter of the pipe does not exceed the predetermined value and the pipe passes the test. If the fingers are in the failing position when the measuring device reaches the second end of the pipe, the user knows the diameter of the pipe does exceed the predetermined value and the pipe fails the test. Most preferably, any failing pipe is not used for pressurized fluid applications. If the fingers are still in the starting position at the second end of the pipe, they will move to the failing position upon removal of the measuring device is removed from the second end of the pipe because the inner surface of the pipe will no longer engage the fingers to hold the spring in a compressed position. The method may be repeated by manually repositioning the fingers to the starting position and repeating steps (2)-(4) above.

According to another preferred embodiment, a method of measuring an inside diameter of a pipe is preferably carried out using a measuring system 10 according to a preferred embodiment of the invention. The method preferably comprises: (1) positioning or inserting a strap through a pipe to be measured so that it extends through the pipe and is accessible from or extends out of a first end of the pipe and a second end of the pipe; (2) connecting a first end of the strap disposed at the first end of the pipe to pull handle 66; (3) partially inserting system 10 into the first end of a pipe with pull handle 66 being inserted first; (4) applying pushing force on push handle 60 to force fingers 12 into a running or starting position as shown in FIG. 2; (5) continuing to insert system 10 into the pipe until a portion of fingers 12 (preferably an outer end of each finger) is engaged with the inside surface of the pipe (still in the running position); (6) pulling on the second end of the strap to pull system 10 through the length of pipe; (7) determining a position of the fingers at the second end of the pipe to ascertain if the fingers are in the starting position or the failing position; and (8) removing system 10 from the second end of the pipe. The steps may be repeated to measure a different pipe.

Most preferably, step (7) comprises viewing a position of indictor rod 18 through viewing apertures 39 prior to removing system 10 from the pipe. The position of indicator rod 18 relative to apertures 39 indicates whether the fingers are still in the starting position or in the failed position. Most preferably, indicator rod 18 has a length configured to allow indicator rod to be visible through apertures 39 when the indicator rod is in a first position that corresponds to the fingers being in the starting position, but indicator rod will not be visible in apertures 39 when indicator rod is in a second position that corresponds to the fingers being in the failed position. When in the starting position, spring 16 is held in a compressed position by the force of the inside surface of the pipe wall on fingers 12, which holds carrier 20 in a forward position so that annular lip 26 compresses spring 16 and a forward facing end of forward carrier body 28 abuts a rearward facing end of indicator rod 18 to hold the indicator rod in a first (forward) position such that at least a portion of indicator rod 18 is visible through apertures 39. When in the failed position, spring 16 applies rearward force on annular lip 26, which moves carrier 20 rearwardly so that a rearward face of socket body 22 applies a rearward force on annular lip 56, which moves compression rod 50 and attached indicator rod 18 rearward, such that a forward end of indicator rod 18 is in a second (rearward) position (rearward of apertures 39) and not visible through apertures 39.

Alternatively, indicator rod may be sufficiently long to be visible in both the starting and failing positions, but have a first indicator (such as a color or pattern on an exterior surface of a first portion of indicator rod 18) that would be visible through apertures 39 to indicate the fingers are in the starting position and a second indicator (such as a different color or different pattern on an exterior surface of a second portion of indicator rod 18) that would be visible through apertures 39 to indicate the fingers are in the failing position. As an additional alternative, an indicator rod may be omitted and a user may view inside the second end of the pipe to see if the fingers are in the starting position or the failing position. The outer ends of fingers 12 may be colored differently (preferably in a bright color) from other portions of system 10, or may be coated with a glow in the dark coating or have an LED to allow the finger position be more easily viewable through the second end of the pipe.

Most preferably step (3) comprises aligning an outer edge of a support body 72 (such as outer ends of fins 74) (if used) with an inside edge of the first end of the pipe to place system 10 in a substantially central location within the pipe being measured. The order of steps (3) and (4) relative to each other is not critical and step (4) may be carried out before step (3). Step (4) most preferably comprises a user grasping a rear end of central cylindrical body 36 (preferably forward of rear support body 72) with one hand while applying a pushing force on push handle 60 with the other hand. Most preferably, central cylindrical body 36 is sufficiently long to allow the user's hand to be clear of the outer ends of fingers 12 when they are forced into the starting position; however, the angle α preferably allows sufficient room for the user's hand to be removed and so that the user's hand is not contacted by the fingers 12 when in the starting position. A user may also grasp fins 74, central hub 76, or rear inner shoulder 80 (or a combination thereof) instead of central cylindrical body 36 when performing step (4). Most preferably, the pushing force applied by the user in step (4) is maintained until a portion of the fingers 12 (preferably an outer end of each finger) engages with an inner surface of the pipe wall in step (5), then the user may release the pushing force and release contact with system 10.

According to another preferred embodiment, a method of measuring an inside diameter of a pipe is preferably carried out using a measuring system 10 having two or more sets of interchangeable fingers of differing D1 distances. The method preferably comprises: (a) selecting a set of fingers 12 having a D1 value corresponding to the nominal ID of the pipe being measured; (b) connecting each of the set of fingers 12 to each of a corresponding bearing 40; and proceeding with steps (1)-(8) above. The process may be repeated for a different pipe having a different nominal ID by selecting the set of fingers 12 having a D1 value corresponding to the new nominal ID and connecting them to the bearings 40. According to another preferred embodiment, a method of measuring an inside diameter of a pipe is preferably carried out using a measuring system 10 having two or more sets of interchangeable discs or fins 74 of differing D4 distances. The method preferably comprises: (c) selecting a disc or set of fins 74 having a D4 value corresponding to the nominal ID of the pipe being measured; (d) connecting the disc or each of the set of fins 74 to a central hub 76 or to outer housing 30; and proceeding with steps (1)-(8) above. The process may be repeated for a different pipe having a different nominal ID by selecting the disc or set of fins 74 having a D4 value corresponding to the new nominal ID and connecting to the central hub 76 or outer housing 30. Most preferably interchangeable fingers 12 are used with interchangeable fins 74 and steps (a)-(d) are carried out before proceeding with steps (1)-(8).

It is generally not necessary to ascertain where along the length of pipe the diameter exceeded the D1 value resulting in a failure. Typically, when a pipe fails the diameter test the entire pipe length is rejected and not used for the pressurized application. However, if a user desires to cut out a failing portion of the pipe and use the remainder, the location of the failure can typically be ascertained by the sound of the fingers snapping from the starting position to the failing position. If desired, a method according to another preferred embodiment comprises the following additional steps: (9) a first user walks along the length of the pipe as the system 10 is being pulled through the pipe by a second user, preferably the first user maintaining a position on the exterior of the pipe substantially corresponding or aligned with the position of system 10 on the interior of the pipe; (10) the first user listens for movement of the fingers between the starting and failing positions; and (11) the first user optionally marks a location on an exterior of the pipe where the system 10 was located when the movement occurred. If the failing portion of the pipe is cut away, it is preferred to repeat the measuring method on the remainder of the pipe to ensure there are not additional areas of the pipe that have an inner diameter greater than D1.

References herein to front, forward or forwardly and the like refer to the direction from push handle 60 toward pull handle 66 as shown in the figures and the direction from a first end of a pipe (where system 10 or another measuring device would be inserted prior to measuring) toward an opposite or second end of a pipe (where system 10 or another measuring device would be removed after measuring). References herein to back, rear, rearward or rearwardly and the like refer to the direction from pull handle 66 toward push handle 60 as shown in the figures and the direction from a second end of a pipe (where system 10 or another measuring device would be removed after measuring) toward the opposite or first end of the pipe (wherein system 10 or another measuring device would be inserted prior to measuring). Unless specifically excluded, references herein to pipe or piping include any type of pipe, tube, or conduit that may be used to transport a fluid from one location to another, such as oilfield tubulars, drilling pipe, risers, or casing, and include any material that may be used for such pipe, including metal, PVC or other plastics, and ceramic materials. Any recess described with a first component or part to allow attachment to a corresponding mating end of a second component or part can be included in the second component or part rather than the first component or part, with the corresponding mating end on the first component or part. Unless a removable or releasable connection or attachment is indicated, any type of connection mechanism may be used to connect or attach two components or parts herein, including by threaded engagement, adhesive, pressure or friction fitting, rivets, welding, or soldering. Removable or releasable connection or attachment of two components or parts herein preferably comprises threaded engagement, screws, nuts and bolts, and/or pressure or friction fitting.

Any feature or step of a preferred embodiment herein may be used with any other features or steps of other embodiments even if not specifically described with respect to that embodiment. All amounts for distances, angles, percentages, or other numeric values indicated herein as a range include each individual distance, angle, percentage, or numeric value within those ranges and any and all subset combinations within those ranges, including subsets that overlap from one preferred range to a more preferred range and even if the specific subset of the range is not specifically described herein. Any feature or step described as included or excluded with any particular preferred embodiment herein may similarly be included or excluded with any other preferred embodiment herein even if not specifically described with such embodiment. Those of ordinary skill in the art will also appreciate upon reading this specification and the description of preferred embodiments herein that modifications and alterations to the system and method may be made within the scope of the invention and it is intended that the scope of the invention disclosed herein be limited only by the broadest interpretation of the appended claims to which the inventors are legally entitled.

What is claimed is:

1. A measuring system for determining if an inner diameter of a length of a pipe exceeds a predetermined value, the system comprising: an outer housing; a plurality of fingers extending outwardly from the outer housing, each finger comprising an outer end; and wherein the plurality of fingers are configured to pivot from a starting position, through a fully extended position, and to a failing position if the inner diameter of the length of the pipe exceeds the predetermined value as the measuring system traverses through the length of the pipe in a forward direction; wherein the plurality of fingers are substantially perpendicular to the outer housing when in the fully extended position; wherein the plurality of fingers are oriented with their outer ends toward the forward direction when in the failing position; wherein the plurality of fingers are oriented with their outer ends toward a rearward direction when in the starting position; and wherein the system does not include any electronic components.

2. The measuring system of claim 1, wherein the plurality of fingers comprises a first finger and a second finger disposed substantially 180° from the first finger, and wherein a first distance between the outer end of the first finger and the outer end of the second finger when in the fully extended position is equal to the predetermined value.

3. The measuring system of claim 2, wherein the plurality of fingers are disposed at an angle of 31.6° to 32° when in the starting position, the angle measured in the rearward direction from a vertical axis that is substantially perpendicular to a longitudinal axis through the outer housing; and wherein a second distance between the outer end of the first finger and the outer end of the second finger when in the starting position is shorter than the predetermined value.

4. The measuring system of claim 3, wherein the plurality of fingers are disposed at an angle of 31.6° to 32° when in the failing position, the angle measured in the forward direction from the vertical axis.

5. The measuring system of claim 3, wherein a third distance between the outer end of the first finger and the outer end of the second finger in the failing position is shorter than the second distance.

6. The measuring system of claim 2, wherein the pipe has a nominal inside diameter value and a corresponding maximum acceptable inside diameter value; and wherein the predetermined value is equal to or greater than the corresponding maximum acceptable inside diameter value.

7. The measuring system of claim 2, wherein at least a portion of each of the plurality of fingers is configured to engage an inner surface of the pipe when the plurality of fingers are in the starting position.

8. The measuring system of claim 1, further comprising a spring operatively connected to the plurality of fingers, wherein the spring is configured to actuate the plurality of fingers to pivot from the starting position, through the fully extended position, and to the failing position.

9. The measuring system of claim 1, further comprising a carrier that is slidably moveable longitudinally inside the outer housing between a forward position and a rearward position;
wherein each of the plurality of fingers comprises an inner end pivotally connected to the carrier;
wherein the carrier is in the forward position when the plurality of fingers is in the starting position; and
wherein the carrier is in the rearward position when the plurality of fingers is in the failing position.

10. The measuring system of claim 1, wherein the plurality of fingers are configured to pivot together substantially in unison.

11. The measuring system of claim 1, wherein the system does not include any motorized components.

12. The measuring system of claim 1, wherein the system is configured to traverse through the length of pipe by being pulled.

13. A measuring system for determining if an inner diameter of a length of a pipe exceeds a predetermined value, the measuring system comprising: an outer housing; a plurality of fingers extending outwardly from the outer housing; and wherein the plurality of fingers are configured to pivot from a starting position to a failing position if the inner diameter of the length of pipe exceeds the predetermined value as the measuring system traverses through the length of pipe in a forward direction; and wherein the system does not include any electronic components.

14. The measuring system of claim 13, wherein each of the plurality of fingers comprises an outer end; wherein the plurality of fingers are oriented with their outer ends toward the forward direction when in the failing position; and wherein the plurality of fingers are oriented with their outer ends toward a rearward direction when in the starting position.

15. The measuring system of claim 13, wherein the system does not include any motorized components.

16. A method of determining if an inner diameter of a length of a pipe exceeds a predetermined value, the method comprising: inserting a measuring device comprising an outer housing and a plurality of fingers extending outwardly from the outer housing into a first end of the pipe to be measured with the plurality of fingers in a starting position; moving the measuring device through the length of the pipe from the first end to a second end; observing a position of the plurality of fingers at the second end of the pipe to determine if the plurality of fingers are in the starting position or a failing position; wherein the plurality of fingers are configured to pivot from the starting position to the failing position if the inner diameter of the length of the pipe exceeds the predetermined value as the measuring device moves through the length of the pipe in a forward direction; and wherein the measuring device does not include any electronic components.

17. The method of claim 16, further comprising: positioning a strap through the length of the pipe; connecting a first end of the strap at the first end of the pipe to the outer housing prior to the inserting step; and wherein the moving step comprises pulling the strap from the second end of the pipe so the measuring device moves in the forward direction.

18. The method of claim 16, wherein each of the plurality of fingers comprises an outer end; wherein the plurality of fingers are oriented with their outer ends toward the forward direction when in the failing position; and wherein the plurality of fingers are oriented with their outer ends toward a rearward direction when in the starting position.

19. The method of claim 16, wherein the plurality of fingers are configured to pivot together substantially in unison.

* * * * *